Patented Apr. 6, 1937

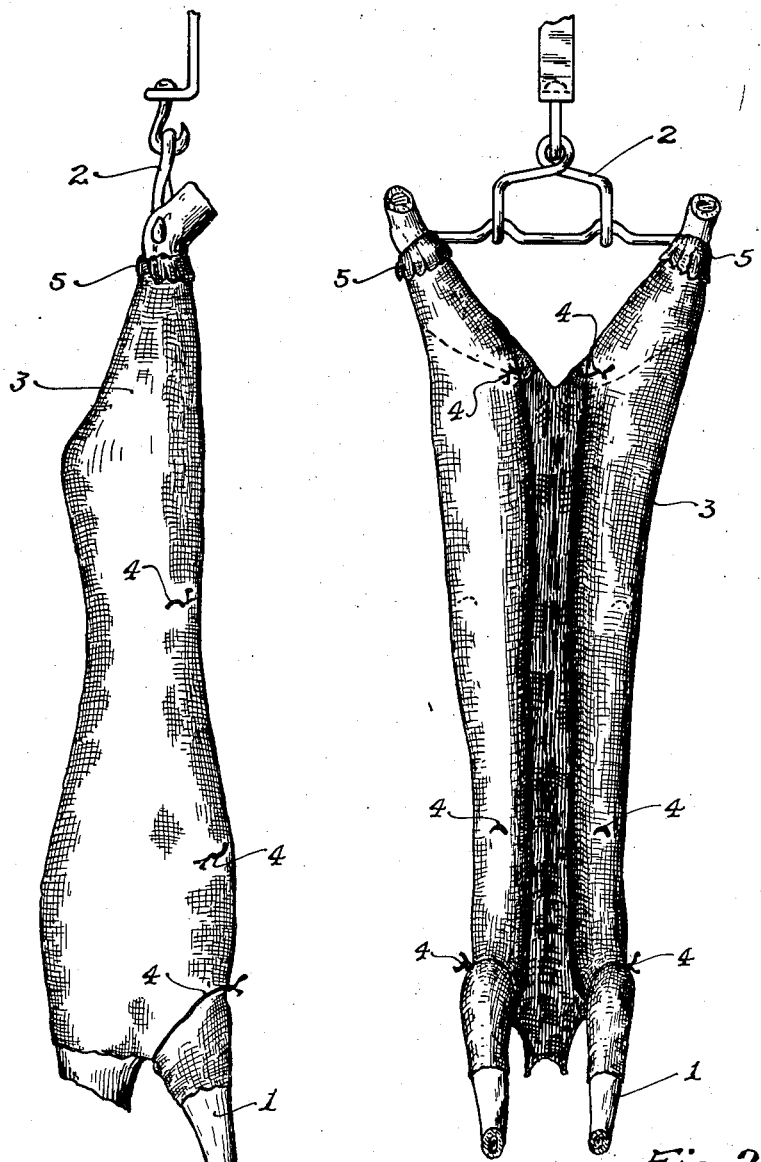

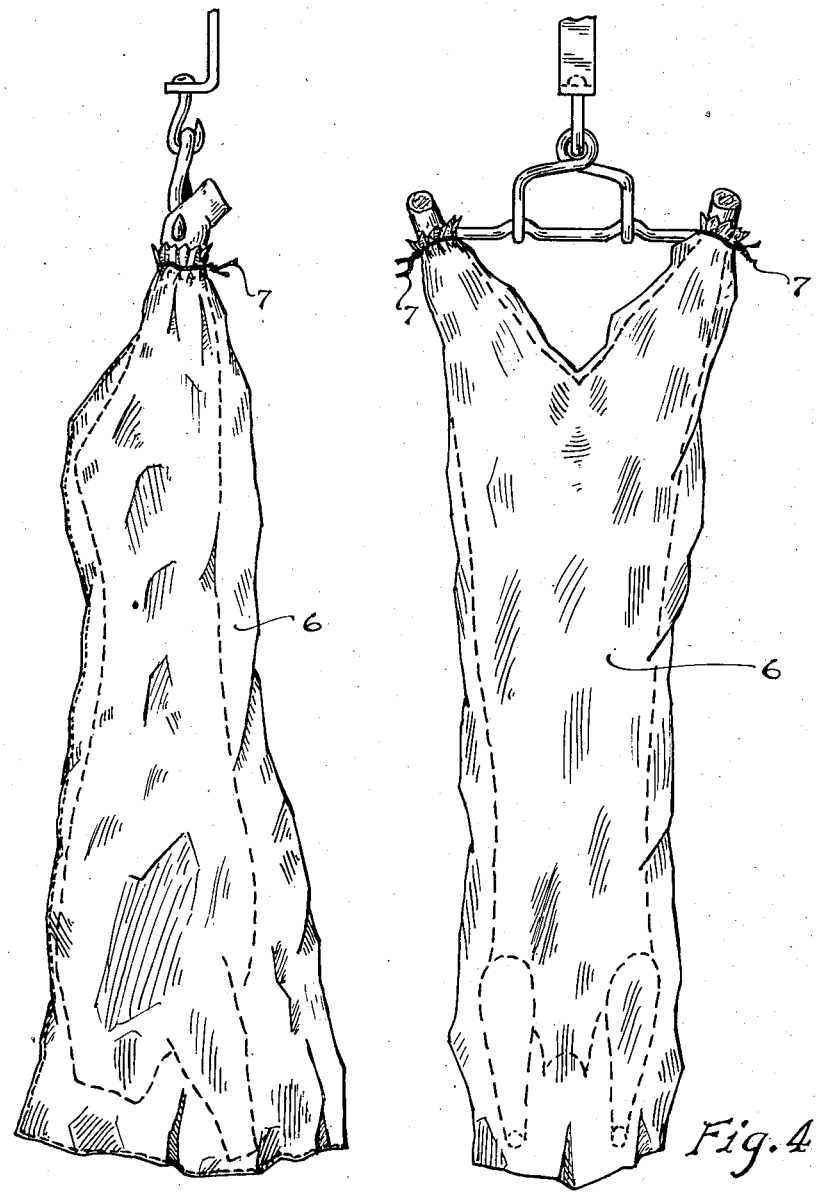

2,076,053

UNITED STATES PATENT OFFICE 2,076,053

TREATMENT OF CALVES

Beverly E. Williams and Leon L. Cadwell, Chicago, Ill., assignors to Industrial Patents Corporation, Chicago, Ill., a corporation of Delaware Application April 17, 1936, Serial No. 74,870

4 Claims. (Cl. 99—157)

This invention relates to the treatment of the carcasses of calves.

One of the objects of the invention is to provide an improved method of dressing calves.

Another object of the invention is to provide a method of packaging calf carcass meat.

Other objects of the invention will be apparent from the description and claims which follow.

Due to the highly perishable character of calf carcasses, many calves are delivered to the retail butcher unskinned. The surface of a skinned calf carcass is not protected by a layer of fat such as is found on beef carcasses and is readily susceptible to bacterial contamination. The surface of a skinned calf carcass rapidly loses the bloom and appearance characteristic of freshly dressed, freshly skinned calf carcasses, with the result that the product is graded down and necessarily sold at a lower price.

Butchers located in the immediate vicinity of an abattoir may purchase skinned calves in prime condition. The present invention provides a method for the preparation of calves whereby calves may be skinned in the abattoir, shipped to remote points and arrive in prime condition, as is conventionally done with beef and lamb carcasses.

Various methods have been proposed from time to time for clothing and otherwise wrapping fresh meat to preserve the meat in a natural fresh condition. Such expedients, however, have not been found of any avail in preserving the natural fresh bloom on calf carcasses.

Attention is called to the drawings in which similar reference characters in the several figures indicate identical elements.

Figure 1 is a side view of a clothed calf carcass in the course of the preparation of the package of the present invention.

Figure 2 is a front view of the clothed carcass shown in Figure 1.

Figure 3 is a side view of a carcass such as is shown in Figure 1 which has been completely encased in a bag in accordance with the present invention.

Figure 4 is a front view of the package shown in Figure 3.

In carrying out the present invention, the calf carcass 1, which is preferably suspended from a suspension means such as 2, is covered with a cloth 3 which has been soaked in a salt water solution. Cloth 3 is preferably prepared from beef sheeting. A satisfactory shroud may be prepared from a piece of beef sheeting, 40 inches by 60 inches in size, with a split of 12 inches cut down from the center of one of the 40 inch ends. Before application to the calf carcass, the shroud is lightly moistened with a preservative, preferably a sodium chloride water solution from 5° to 20° salometer reading strength. The cloth is then tightly and smoothly applied on the skinned surfaces of the carcass and fastened by such means as pins, sewed string stitches, or string ties and self binding tucks. In the latter instance, the self binding tucks occur at the gambrel cords.

In the example shown in Figures 1 and 2, string ties such as 4 and self binding tucks such as 5 are employed. It will be understood, of course, that any other means may be employed to clothe the calf carcass with a smooth close fitting shroud.

Immediately after clothing, a paper bag, preferably a crinkled paper bag such as a Kraft bag 6, closed on all sides and at one end, is pulled over the carcass and fastened in place by a string tie 7 at each of the knee joints of the hind legs, as shown in Figure 3 and Figure 4. A complete enclosure is effected by folding the top of the bag between the hind legs in confectioners' style.

It has been found in practice that the mere bagging or mere clothing of a calf carcass is insufficient to preserve the appearance and condition of the skinned surface. It has also been found in practice that it is insufficient to merely clothe a calf carcass with a cloth which has been moistened in salt water.

The present invention contemplates a method which gives surprising results in veiw of the failure of mere clothing or mere bagging to noticeably effect any preservation.

Many tests of the effectiveness of the present invention have been made.

In one test, calves were prepared in accordance with the present invention, other calf carcasses were covered with stockinet in the conventional manner, and other hide-on calves were held in a 32° to 34° F. cooler for twelve days. After this period of time it was found that the calf carcasses prepared in accordance with the present invention were in a fine state of preservation. The stockinetted cold skinned calves were entirely unsatisfactory, being very dark in color and unsatisfactory for carcass goods or veal cuts trade. The hide-on calves were not acceptable from the standpoint of both inside and skinned surfaces.

Subjection of three groups of calf carcasses, prepared as in the aforegoing test to 95° F. air temperature and approximately 55° relative humidity for a period of four hours, resulted in no appreciable change in the calf carcasses prepared in accordance with the present invention, whereas both hide-on calf carcasses and stockinetted calf carcasses were definitely deteriorated by the warm circulating air.

Groups of calf carcasses similarly prepared were subjected to a temperature of 0° F. for four hours, and it was found that both hide-on and stockinetted calves had become frozen throughout the thinner sections of the carcass, whereas the carcasses prepared in accordance with the present invention were not frozen. After defrosting, the hide-on and stockinetted calves presented a darkened and softened condition of the skinned and exposed surfaces.

It will be apparent from the foregoing tests that calf carcasses prepared in accordance with the present invention are definitely superior to calf carcasses prepared in the conventional manner.

A preferred method of carrying out the present invention is to skin the calf carcass after it has lost its animal heat, then apply a brine moistened cloth to the cold calf carcass, and thereafter enclose the clothed calf in a suitable paper bag which is substantially but not entirely impervious to moisture and air.

We claim:

1. The method of treating skinned calf carcasses which comprises covering the skinned surface with brine moistened cloth and thereafter enclosing the clothed carcass in a paper bag.

2. The method of treating calf carcass meat which comprises skinning the carcass after it has lost its animal heat, clothing the skinned calf carcass meat with brine moistened cloth, and enclosing the clothed calf carcass meat in an outer covering substantially impervious to air and moisture.

3. The method of treating skinned calf carcasses which comprises applying to the skinned surface a cloth covering moistened with salt brine, holding the cloth smoothly in intimate relationship with the skinned surface, and enveloping the clothed carcass in heavy paper.

4. The method of treating calf carcasses which comprises chilling the carcasses after slaughter with the hides on, removing the hides from the chilled carcasses, applying a cloth treated with sodium chloride salt water solution to the outer surfaces of the skinned carcasses, encasing the covered carcasses in wrappers substantially impervious to moisture evaporated from the carcasses and thereafter placing the carcasses under refrigeration.

BEVERLY E. WILLIAMS.
LEON L. CADWELL.